United States Patent
Son et al.

(10) Patent No.: US 8,054,030 B2
(45) Date of Patent: Nov. 8, 2011

(54) PERMANENT MAGNET AC MOTOR SYSTEMS AND CONTROL ALGORITHM RESTART METHODS

(75) Inventors: Yo Chan Son, Torrance, CA (US); Seok-Joo Jang, Irvine, CA (US); Rostam Dehmoobed Nasrabadi, Porter Ranch, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 851 days.

(21) Appl. No.: 12/017,817

(22) Filed: Jan. 22, 2008

(65) Prior Publication Data
US 2009/0184678 A1 Jul. 23, 2009

(51) Int. Cl.
*H02P 21/14* (2006.01)
(52) U.S. Cl. ......... 318/778; 318/102; 318/103; 318/431
(58) Field of Classification Search .......... 318/798–815, 318/431, 54, 65, 86, 101–103, 400.32, 400.33, 318/400.35, 778; 361/23
See application file for complete search history.

(56) References Cited

U.S. PATENT DOCUMENTS

| | | | |
|---|---|---|---|
| 5,703,449 A * | 12/1997 | Nagate et al. | 318/400.01 |
| 5,744,921 A * | 4/1998 | Makaran | 318/400.34 |
| 6,788,490 B2 | 9/2004 | Schillaci et al. | |
| 6,894,454 B2 | 5/2005 | Patel et al. | |
| 7,211,984 B2 * | 5/2007 | Patel et al. | 318/778 |
| 7,557,530 B2 * | 7/2009 | Tesch et al. | 318/700 |
| 7,652,441 B2 * | 1/2010 | Ying Yin Ho | 318/400.32 |
| 2003/0218444 A1 | 11/2003 | Marcinkiewicz et al. | |
| 2005/0179264 A1 | 8/2005 | Ganev | |
| 2006/0097688 A1 * | 5/2006 | Patel et al. | 318/778 |
| 2006/0119312 A1 | 6/2006 | Okamura et al. | |
| 2007/0145939 A1 | 6/2007 | Tajima et al. | |
| 2007/0164694 A1 | 7/2007 | Berto | |
| 2009/0140676 A1 | 6/2009 | Son et al. | |

(Continued)

FOREIGN PATENT DOCUMENTS
CN 1976213 A 12/2010

OTHER PUBLICATIONS

Son, Y., et al. "Sensorless Operation of Permanent Magnet Motor Using Direct Voltage Sensing Circuit," Record of the Industry Applications Conference, 2002, pp. 1674-1678, vol. 3.

(Continued)

*Primary Examiner* — Eduardo Colon Santana
(74) *Attorney, Agent, or Firm* — Ingrassia Fisher & Lorenz, P.C.

(57) ABSTRACT

Permanent magnet alternating current (PMAC) motor systems and methods for starting or restarting PMAC motor system sensorless control algorithms are provided. One system includes a PMAC motor including a rotor, an inverter, and a controller. The controller includes control logic, start/restart logic, drive logic, current detect logic, and estimation logic configured to estimate a position of the rotor, a speed of the PMAC motor, or both based on current detected in each phase of the inverter. A start/restart method includes determining to start/restart the sensorless control algorithm and modifying the inverter voltage in response to the determined start/restart. The method also includes detecting current in each inverter phase after the inverter voltage is modified and estimating a rotor position, a PMAC motor speed, or both based on the current detected in each inverter phase after the inverter voltage is modified. Another controller includes means for performing the above start/restart method.

18 Claims, 5 Drawing Sheets

U.S. PATENT DOCUMENTS

2010/0064706 A1\* 3/2010 Hattori et al. ................... 62/157

OTHER PUBLICATIONS

Pan, H., et al. "Improving the start and restart behavior through state recognition of AC drives," IEEE Proceeding of the Power Conversion Conference, Aug. 3-6, 1997, pp. 589-594, vol. 2.

Taniguchi, S., et al. "Starting Procedure of Rotational Sensorless PMSM in the Rotating Condition," IEEE Transactions on Industry Applications, Jan.-Feb. 2009, pp. 194-202, vol. 45, No. 1.

Son, Y.C. et al., "Method and System for Initiating Operation of an Electric Motor," U.S. Appl. No. 12/606,839, filed Oct. 27, 2009.

Office Action dated Aug. 18, 2011 for U.S. Appl. No. 11/947,501.

\* cited by examiner

PERMANENT MAGNET AC MOTOR SYSTEMS AND CONTROL ALGORITHM RESTART METHODS

FIELD OF THE INVENTION

The present invention generally relates to electric motors, and more particularly relates to permanent magnet alternating current (PMAC) motor systems and methods for restarting a PMAC motor system control algorithm.

BACKGROUND OF THE INVENTION

Permanent magnet alternating current (PMAC) motor systems may be utilized in many different applications and are well-known in the art. Some PMAC motor systems include a PMAC motor connected to each phase of a three-phase inverter, and a controller connected to the PMAC motor and the three-phase inverter in a configuration known as a three-phase PMAC motor.

The three-phase inverter is configured to provide voltage to the PMAC motor to control the amount of torque produced by the PMAC motor. To do this, each inverter phase is coupled between a voltage source and the PMAC motor, and includes a pair of (e.g., a high-side and a low-side) field effect transistors ("FETs") or other type of solid state switching devices that, via their switching operations (i.e., ON/OFF functions), control the amount of voltage provided to the PMAC motor. The switching operations of the switching devices are typically controlled using pulse-width-modulation ("PWM") techniques. Specifically, the switching devices are connected to provide three-phase voltage to the A, B, and C phases of the PMAC motor. During operation, the A, B, and C phases of the PMAC motor are maintained 120 degrees (electrical) apart. For example, if phase A is at 120 degrees (i.e., $\theta=120°$), then phase B would be at phase A plus 120 degrees (i.e., $\theta+120°$), and phase C would be at phase A minus 120 degrees (i.e., $\theta-120°$).

The amount of torque produced by the PMAC motor is functionally related to the amplitude of the electric current in the A, B, and C phases, which is also referred to as the motor current. The frequency of the motor current is selected to create a magnetic field or flux in the phase windings that rotate about an armature at a predetermined speed, which induces a rotor in the PMAC motor to rotate. The rotational speed of the rotor is thus determined by the amplitude and frequency of the motor current.

Typically, the rotating flux is commanded to lead the rotor by some angle, which is often referred to as an "advance angle." The advance angle can be controlled by adjusting the phase angle of the current supplied to the PMAC motor windings, and is increased as the rotor speed increases, depending on the torque and power requirements of the PMAC motor. If the flux is not leading the rotor by the proper advance angle and/or if the flux does not include the proper rotational speed, the PMAC motor may experience high currents and/or torque oscillations, which can result in damage the PMAC motor system.

To prevent the PMAC motor from experiencing high currents and/or torque oscillations, PMAC motor systems track the present position of the rotor (or the flux) and the present motor speed at all times. As such, PMAC motor systems typically include an absolute position sensor (e.g., a resolver) to synchronize the rotor position and the motor speed, or employ a control algorithm that estimates the rotor position and motor speed without the use of a mechanical sensor, which control algorithm is often referred to as a "sensorless algorithm" or a "sensorless control algorithm," to track the present position of the rotor (or the flux) and the present motor speed during operation.

A sensorless control algorithm is typically performed by the controller, and the controller estimates the present rotor position and present motor speed based on a measurement of the inverter output voltage (i.e., the voltage in each inverter phase) and the inverter output current (i.e., the current in each inverter phase). In some sensorless control algorithms, the controller assumes that the rotor is at a "zero position" and that the motor has a "zero speed" (i.e., is at rest) when starting (or restarting) the sensorless control algorithm. A problem may arise in this type of sensorless control algorithm because there can be times when the rotor may not be at the "zero position" because the rotor is rotating when the controller starts the sensorless control algorithm. For example, an engine fan rotor may be rotating at the start of the sensorless control algorithm because air flowing through the engine is applying a force to the fan blades, which causes the rotor to rotate, while a motor vehicle is being driven. Similarly, execution of the sensorless control algorithm may be interrupted due to external events (e.g., the PMAC motor system being exposed to strong electromagnetic interference), or by the unlikely event of a diagnostic malfunction, both of which would require that the controller restart the sensorless control algorithm while the PMAC motor is operating and the rotor is rotating. That is, in each of these situations, the sensorless control algorithm has to be started or restarted without any knowledge of the present rotor position and present motor speed (referred to hereinafter as "initial conditions").

To solve this problem, PMAC motor systems typically use one or more additional circuits and/or sensors to calculate the initial conditions. Specifically, these additional circuits and/or sensors detect the actual output voltage of the inverter and calculate the initial conditions based on the detected inverter output voltage. In these PMAC motor systems, after the sensorless control algorithm is stopped and the controller is reset, the proper initial conditions (i.e., the newly calculated rotor position and motor speed) are calculated based on the measured inverter output voltage, and a restart portion of the sensorless control algorithm is performed in order to provide the proper initial conditions to the sensorless control algorithm.

Accordingly, it is desirable to provide PMAC motor systems and methods for starting or restarting a PMAC motor system sensorless control algorithm without needing additional circuits and/or sensors to detect the inverter output voltage and using the inverter output voltage to calculate the proper initial conditions. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

PMAC motor systems are provided. One exemplary PMAC motor system comprises a PMAC motor including a rotor, a three-phase inverter coupled to the PMAC motor and configured to provide a voltage to the PMAC motor, and a controller coupled to the three-phase inverter and to the PMAC motor. The controller comprises control logic configured to perform a sensorless control algorithm for controlling the PMAC motor, start/restart logic configured to determine when to start/restart the sensorless control algorithm, and drive logic configured to drive the voltage to substantially zero volts in response to a determined start/restart of the sensorless control algorithm. The controller also comprises current detect logic configured to detect current in each phase of the three-phase inverter when the voltage is substantially zero volts and estimation logic configured to estimate a position of the rotor, a speed of the PMAC motor, or both based on the detected current.

Methods are also provided for starting or restarting a sensorless control algorithm for controlling a permanent magnet AC (PMAC) motor including a rotor coupled to a three-phase inverter having a voltage. An exemplary method comprises the steps of determining to start/restart the sensorless control algorithm and modifying the voltage in response to the determined start/restart of the sensorless control algorithm. The method also comprises the steps of detecting current in each phase of the three-phase inverter after the voltage is modified and estimating a position of the rotor, a speed of the PMAC motor, or both based on the detected current.

Controllers capable of being coupled to a permanent magnet AC (PMAC) motor including a rotor and to a three-phase inverter having a voltage coupled to the PMAC motor are also provided. One exemplary controller comprises means for performing a sensorless control algorithm utilized to control the PMAC motor, the performing means configured to be coupled to the rotor and the PMAC motor, means for determining to when start/restart the sensorless control algorithm in communication with the performing means, and means for driving the voltage to substantially zero volts in response to a determined start/restart of the sensorless control algorithm in communication with the determining means. The controller further comprises means for detecting current in each phase of the three-phase inverter when the voltage is substantially zero volts in communication with the driving means. and means for estimating a first position of the rotor, a speed of the PMAC motor, or both based on the detected current configured to be coupled to the rotor and the PMAC motor.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
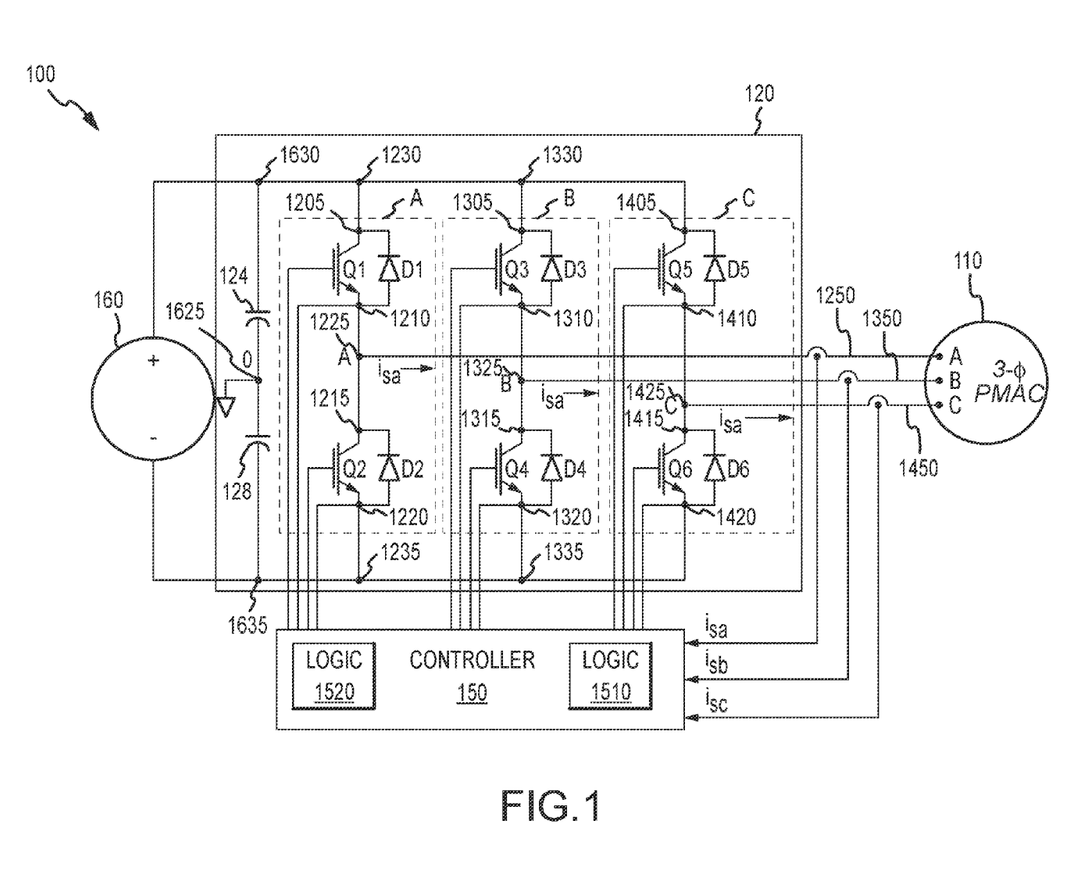
FIGS. 1 and 1A are schematic diagrams of one exemplary embodiment of a permanent magnet alternating current (PMAC) motor system.
Figure 1A:
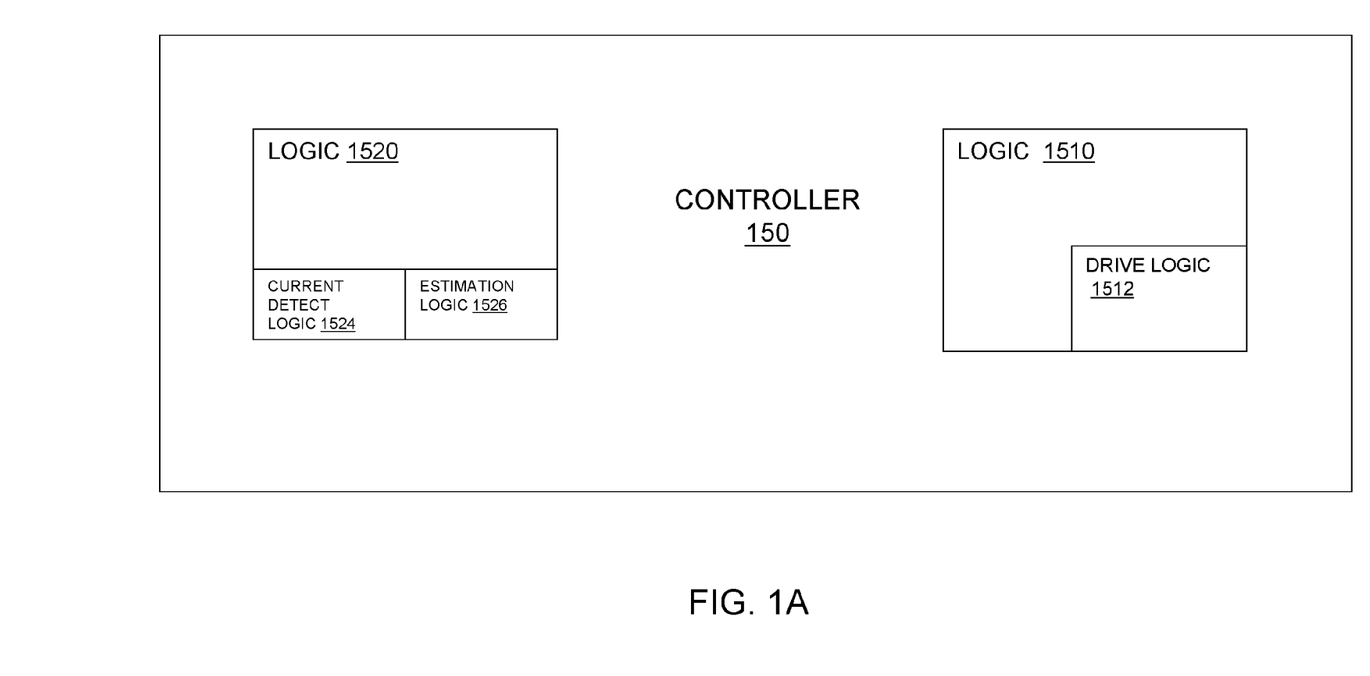

FIG. 1 is a schematic diagram of one exemplary embodiment of a permanent magnet alternating current (PMAC) motor system 100. PMAC motor system 100 comprises a PMAC motor 110 coupled to an inverter 120 and a controller 150, wherein inverter 120 and controller 150 are also coupled to one another.

PMAC motor 110 may be any hardware and/or device capable of producing torque based on an AC voltage input. Specifically, PMAC motor 110 includes a rotor (not shown) that rotates based on the differences in potential of stators arranged in three phases (A, B, and C) and separated from one another by one hundred twenty degrees (120°).

Inverter 120, in one embodiment, is a three-phase inverter including a phase A, a phase B, and a phase C coupled to the A, B, and C phases, respectively, of PMAC motor 110. Specifically, phase A includes a high-side switch (e.g., a semiconductor switch) Q1 coupled in parallel with a diode D1 via nodes 1205 and 1210 and a low-side switch (e.g., a semiconductor switch) Q2 coupled in parallel with a diode D2 via nodes 1215 and 1220. Nodes 1210 and 1215 are coupled to a node 1225 that is coupled to phase A of PMAC motor 110 via a conductor (e.g., a wire) 1250, node 1205 is coupled to a node 1230, and node 1220 is coupled to a node 1235.

Phase B includes a high-side switch (e.g., a semiconductor switch) Q3 coupled in parallel with a diode D3 via nodes 1305 and 1310 and a low-side switch (e.g., a semiconductor switch) Q4 coupled in parallel with a diode D4 via nodes 1315 and 1320. Nodes 1310 and 1315 are coupled to a node 1325 that is coupled to phase B of PMAC motor 110 via a conductor (e.g., a wire) 1350, node 1305 is coupled to a node 1330, and node 1320 is coupled to anode 1335.

Phase C includes a high-side switch (e.g., a semiconductor switch) Q5 coupled in parallel with a diode D5 via nodes 1405 and 1410 and a low-side switch (e.g., a semiconductor switch) Q6 coupled in parallel with a diode D6 via nodes 1415 and 1420. Nodes 1410 and 1415 are coupled to a node 1425 that is coupled to phase C of PMAC motor 110 via a conductor (e.g., a wire) 1450, node 1405 is coupled to node 1330, and node 1420 is coupled to node 1335.

Inverter 120 also includes capacitive elements (e.g., capacitors) 124 and 128. Specifically, capacitive element 124 is coupled to a node 1625 coupled to ground, and to a node 1630 coupled to node 1230 and a positive terminal of a voltage source (e.g., a battery) 160. Capacitive element 128 is coupled to node 1525 and to a node 1635 coupled to node 1235 and a negative terminal of voltage source 160.

As illustrated in FIG. 1, controller 150 is coupled to switches Q1, Q2, Q3, Q4, Q5, and Q6, nodes 1210, 1220, 1310, 1320, 1410, and 1420, and conductors 1250, 1350, and 1450. Controller 150 may include any hardware, firmware, a device (e.g., a processor), and/or other control logic ("logic") 1510 capable of performing a sensorless control algorithm for controlling the amount of torque output by PMAC motor 110 based on the estimated position of the rotor in PMAC motor 110 and the estimated speed of PMAC motor 110, as is known in the art. Specifically, logic 1510 is configured to provide control signals to switches Ql, Q2, Q3, Q4, Q5, and Q6 based on a pole voltage ($V_{AO}$) detected at conductor 1250, a pole voltage ($V_{BO}$) detected at conductor 1350, and a pole voltage ($V_{BO}$) detected at conductor 1450. That is, logic 1510 is configured to turn switches Ql, Q2, Q3, Q4, Q5, and Q6 ON/OFF depending on the inverter pole voltage command, $V_{AO}$, $V_{BO}$ and $V_{CO}$, and the timing needed to create a flux in each of the phase A, B, and C stators at the proper time such that the rotor rotates at the proper speed in response thereto.

Controller 150 also includes hardware, firmware, a device (e.g., a processor), and/or other start/restart logic ("logic") 1520 capable of performing a start/restart algorithm for the sensorless control algorithm. That is, logic 1520 is configured to provide a new estimated rotor position and/or a new estimated motor speed when the sensorless control algorithm needs to be started or restarted. Specifically, logic 1520 is configured to transmit control signals to inverter 120 that result in the output voltage in inverter 120 (i.e., the output voltage in each of phases A, B, and C of inverter 120, referred to hereinafter as the "inverter output voltage") being increased or decreased to substantially zero volts via logic 1512. Current detect logic 1524 of logic 1520 is configured to measure currents $i_{sa}$, $i_{sb}$, and $i_{sc}$ in conductors 1250, 1350, and 1450, respectively, and their respective current angles when the inverter output voltage is substantially zero volts. The measured currents $i_{sa}$, $i_{sb}$, and $i_{sc}$, along with their respective current angles, are used by current detect logic 1524 to calculate a current vector ($\vec{i}_s$) for currents $i_{sa}$, $i_{sb}$, and $i_{sc}$, wherein logic 1520 is configured to calculate current vector $\vec{i}_s$ according to equations (1) and (2), as follows:

$$\begin{bmatrix} i_\alpha \\ i_b \end{bmatrix} = \begin{bmatrix} 2/3 & -1/3 & -1/3 \\ 0 & 1/\sqrt{3} & -1/\sqrt{3} \end{bmatrix} \begin{bmatrix} i_{sa} \\ i_{sb} \\ i_{cs} \end{bmatrix} \quad (1)$$

$$\begin{bmatrix} i_d \\ i_q \end{bmatrix} = \begin{bmatrix} \cos\theta_r & \sin\theta_r \\ -\sin\theta_r & \cos\theta_r \end{bmatrix} \begin{bmatrix} i_\alpha \\ i_\beta \end{bmatrix} \quad (2)$$

Accordingly, current detect logic 1524 is configured to calculate the current vector as $\vec{i}_s = i_d + j i_q$, where "j" is an imaginary unit and $\vec{i}_s$ is the complex representation of two orthogonal currents that are analogous to the phasor.

Since the rotor speed ($\omega_r$) is proportional to the amplitude of $\vec{i}_s$, current detect logic 1524 is configured to determine the amplitude of $\vec{i}_s$ and estimate (discussed below) $\omega_r$ based on the determined amplitude of $\vec{i}_s$. Estimation logic 1526 of logic 1520 is also configured to utilize the measured current angles for currents $i_{sa}$, $i_{sb}$, and $i_{sc}$ to estimate (discussed below) the rotor position ($\theta_r$). Accordingly, estimation logic 1526 is capable of estimating the rotor speed $\omega_r$ and rotor position $\theta_r$ by modifying the voltage in inverter 120. That is, estimation logic 1526 is capable of estimating the motor speed $\omega_r$ and rotor position $\theta_r$ without having to measure the actual output voltage of inverter 120.

The following discussion provides one exemplary embodiment of an algorithm for starting/restarting a sensorless control algorithm by modifying the voltage in inverter 120 to estimate the motor speed $\omega_r$ and rotor position $\theta_r$. The electrical equation of the operation of PMAC motor 110, in complex form, is shown in equation (3).

$$\vec{v}_s = r_s \vec{i}_s + L_s \frac{d}{dt}\vec{i}_s + j\omega_r \Psi_f e^{j\theta_r(t)} = r_s\vec{i}_s + L_s\frac{d}{dt}\vec{i}_s + \vec{E}_s, \quad (3)$$

where $\theta_r(t) = \omega_r t + \theta_{r0}$.

The motor voltage, $\vec{v}_s$, is constructed by the inverter pole voltage, $V_{AO}$, $V_{BO}$ and $V_{CO}$, at conductors 1250, 1350, and 1450, respectively, when switches Q1, Q3, and Q5, or switches Q2, Q4, and Q6 conduct currents $i_{sa}$, $i_{sb}$, and $i_{sc}$, respectively. Here, the inverter pole voltages $V_{AO}$, $V_{BO}$ and $V_{CO}$ become equal to the back electromotive force ($\vec{E}_s$) when inverter 120 is OFF. In other words, by turning ON either all of the high-side switches Q1, Q3 and Q5 or all of the low-side switches Q2, Q4 and Q6, phases A, B, and C in inverter 120 are each shorted and the increase in current in phases A, B, and C of inverter 120 can be measured. When phases A, B, and C of inverter 120 become shorted, the inverter output voltage becomes zero volts or close to zero volts, and the solution to equation (3) can be calculated, as indicated in equation (4) below, provided that the initial current is zero at time zero, $\vec{i}_s(t=0)=0$. Notably, the effect of the voltage drop by switches Q1, Q3, Q5 or switches Q2, Q4, and Q6 in equation (4) is neglected. Furthermore, by assuming that the motor speed $\omega_r$ does not change when the inverter output voltage is substantially zero volts, the motor speed $\omega_r$ can be treated as a constant.

$$\vec{i}_s(t) = \frac{\omega_r \Psi_f}{jL_s} \cdot \frac{\exp(\theta_{r0})}{\frac{1}{\tau} + j\omega_r} \cdot \left[\exp(j\omega_r t) - \exp\left(-\frac{t}{\tau}\right)\right], \text{ where } \tau = \frac{L_s}{r_s}. \quad (4)$$

Assuming time (t) is sufficiently smaller than the winding time constant τ, equation (4) can be approximated as equation (5).

$$\vec{i}_s(t) \approx \frac{2\Psi_f}{L_s} \cdot \sin\left(\frac{\omega_r t}{2}\right) \cdot \exp\left[j\left(\theta_{r0} + \frac{\omega_r t}{2} - \frac{\pi}{2}\right)\right]. \quad (5)$$

From equation (5), the rotor (or flux) position $\theta_r$ and the absolute value of the motor speed $\omega_r$ at $t=T_x$ can be calculated as shown in equations (6) and (7) below. Equation (7) can be simplified even further as equation (8) assuming that the amplitude of $\vec{i}_s$ is less than the demagnetization current level ($\Psi_f/L_s$) of PMAC motor 110, wherein $\Psi_f/L_s$ is a known constant in PMAC motors.

$$\theta_r(T_x) = \omega_r T_x + \theta_{r0} = \arg[\vec{i}_s(T_x)] + \frac{\omega_r T_x}{2} + \frac{\pi}{2}. \quad (6)$$

$$|\omega_r| = \frac{2}{T_x} \cdot \sin^{-1}\left(\frac{L_s}{2\Psi_f} \cdot |\vec{i}_s(T_x)|\right). \quad (7)$$

$$|\omega_r| \approx \frac{L_s}{\Psi_f T_x} \cdot |\vec{i}_s(T_x)|. \quad (8)$$

Accordingly, equations (1)-(8) provide a start/restart algorithm that logic 1520 is configured to perform to estimate motor speed $\omega_r$ and the rotor (or flux) position $\theta_r$ to restart the sensorless control algorithm performed by logic 1510. In another embodiment, logic 1520 is also configured to perform the start/restart algorithm a second time to determine the direction (positive or negative) of motor speed $\omega_r$.

To determine if motor speed $\omega_r$ is a negative speed or a positive speed, logic 1520 is configured to compare the determined rotor/flux position ($\theta_{r1}$) in a first time cycle to the determined rotor/flux position in a second time cycle ($\theta_{r2}$). If $\theta_{r1}$ is greater than $\theta_{r2}$, the motor speed $\omega_r$ is a negative speed or a speed in a negative direction, whereas if $\theta_{r1}$ is greater than $\theta_{r2}$, the motor speed $\omega_r$ is a positive speed or a speed in a positive direction (see equation (9) below).

$$\omega_r = \begin{cases} +|\omega_r|; & \text{if } \theta_{r1} - \theta_{r2} > 0 \\ -|\omega_r|; & \text{if } \theta_{r1} - \theta_{r2} < 0. \end{cases} \quad (9)$$

Figure 2A:
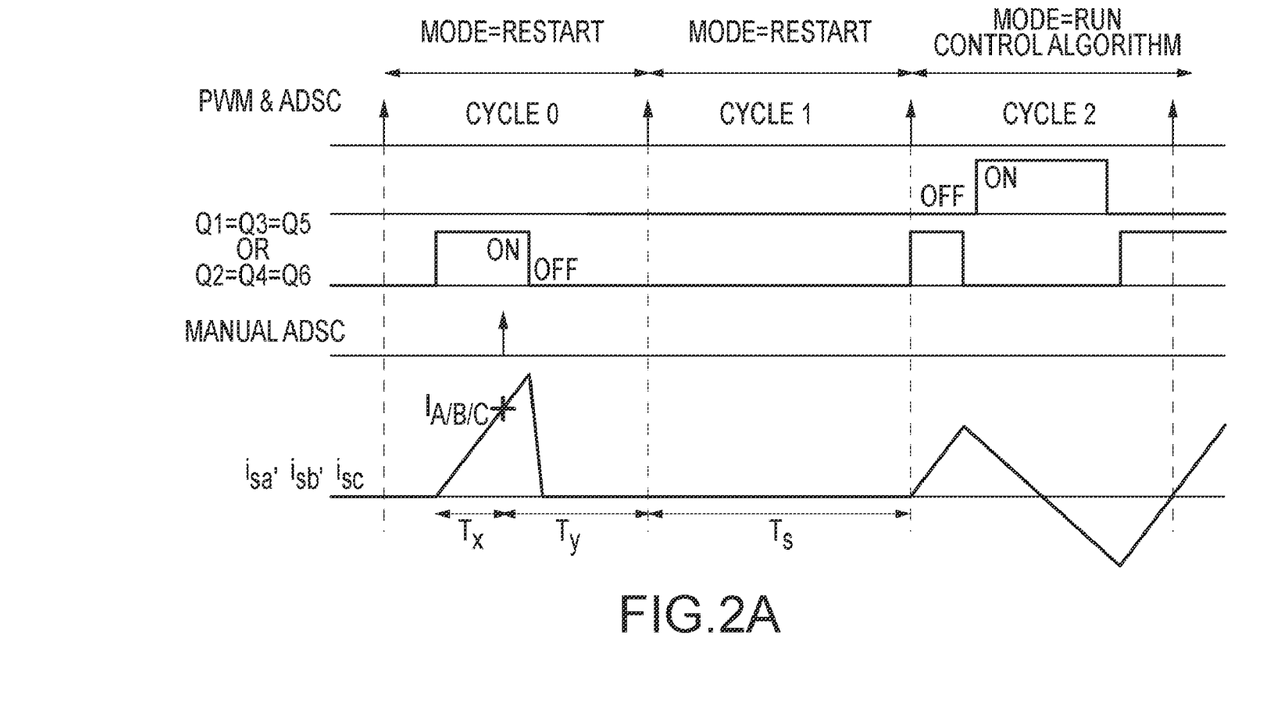
FIGS. 2A-2C are timing diagrams representing an exemplary embodiment of start/restart algorithms for starting or restarting a sensorless control algorithm for the PMAC motor system of FIG. 1.
Figure 2B:
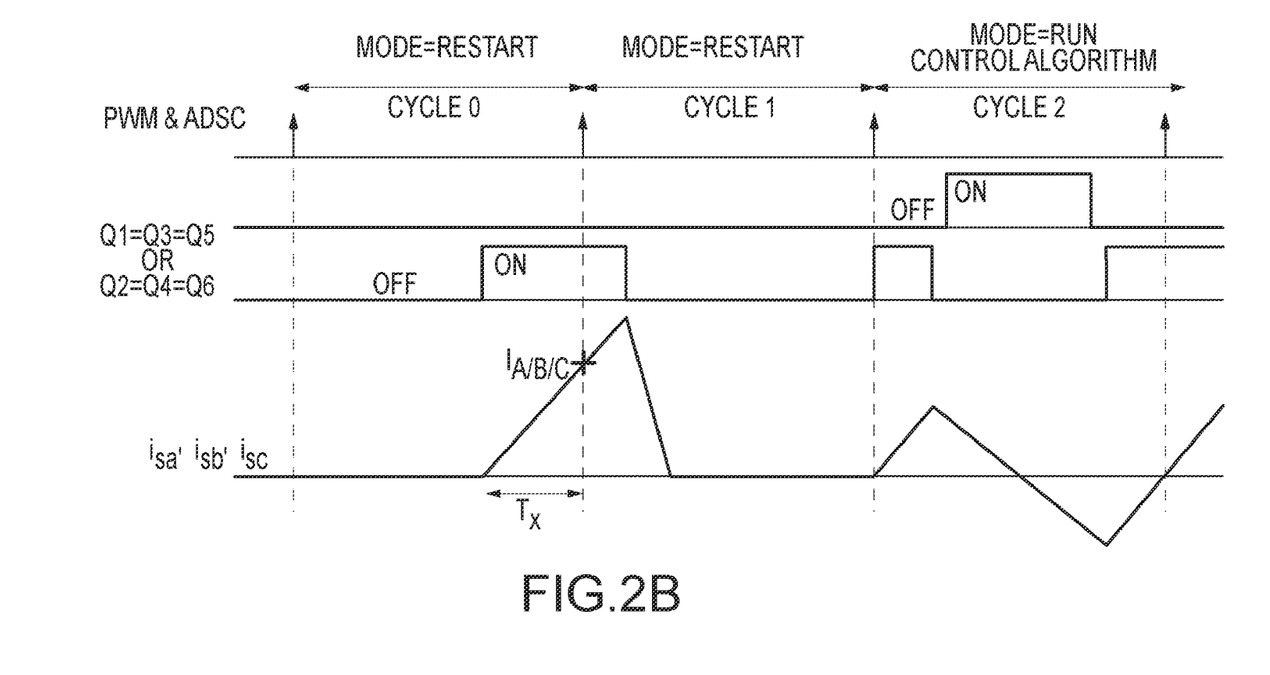
Figure 2C:
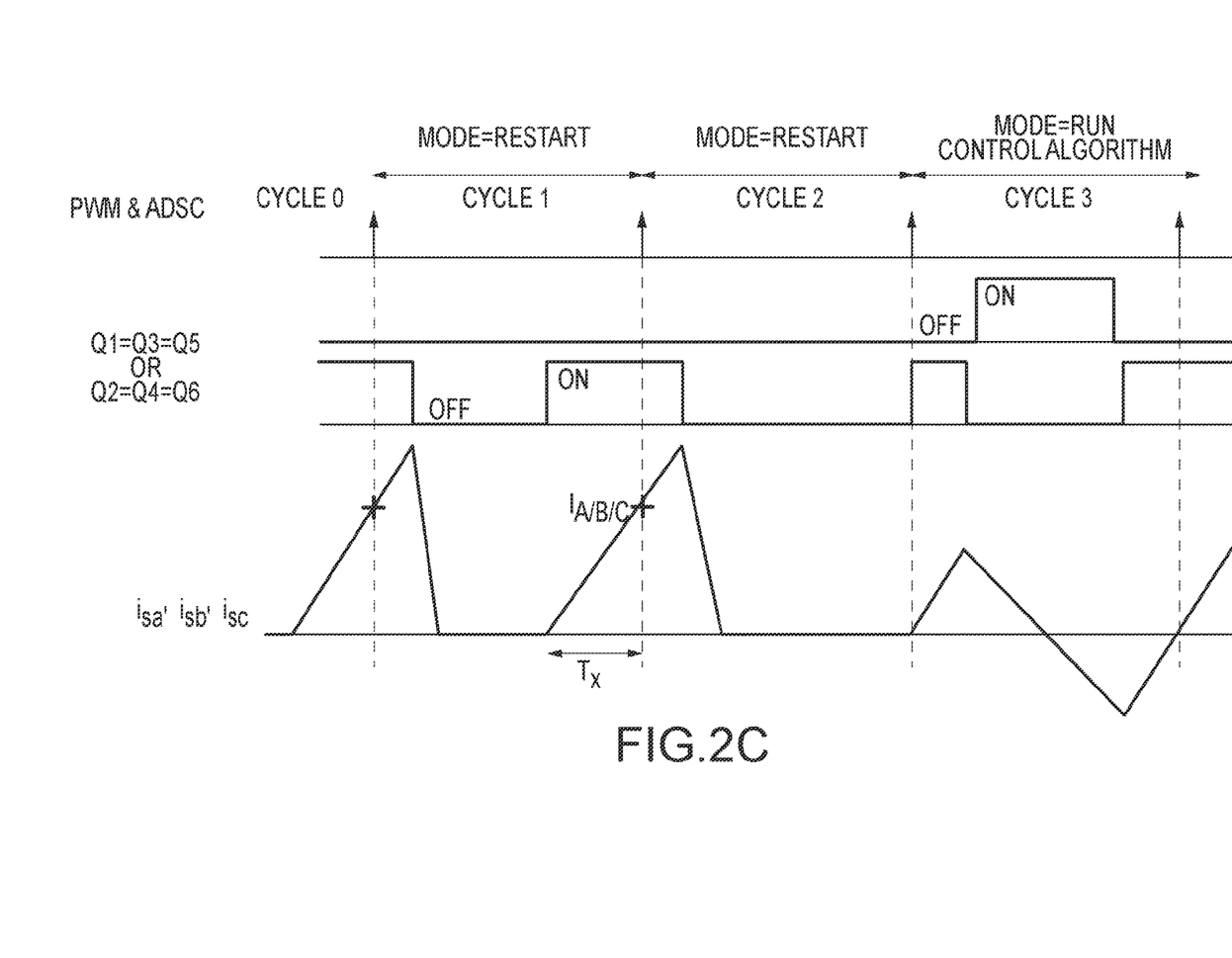

FIGS. 2A-C illustrate an exemplary embodiment of a timing diagram for start/restart algorithms configured to start or restart a sensorless control algorithm for a PMAC motor system (e.g., PMAC motor system 100). In the embodiment illustrated in FIG. 2A, three high-side switches (e.g., switches Q1, Q3, and Q5) or three low-side switches (e.g., switches Q2, Q4, and Q6) are turned ON during cycle 0 or the PWM period, which causes the inverter output voltage to increase or decrease to substantially zero volts. The phase currents (e.g., currents $i_{sa}$, $i_{sb}$, and $i_{sc}$) are sampled at $T_x$, which occurs during cycle 0.

In the start/restart algorithm represented by FIG. 2A, the phase currents are sampled at a time that does not match with a sample time in the sensorless control algorithm, which may require an additional calculation of $\omega_r T_y$ during cycle 1. An estimate of the rotor (or flux) position $\theta_r$ may be calculated using equation (10) in conjunction with equation (6), and the position $\theta_r$ will advance by $\omega_r T_s$ in cycle 1, assuming that the motor speed $\omega_r$ is a constant. In cycle 2, the new estimated rotor/flux position $\theta_r$ and the new estimated motor speed $\omega_r$ generated by the start/restart algorithm in cycles 0 and 1 may then be used by logic (e.g., logic 1510) performing the sensorless control algorithm without making an unwanted transient response (e.g., an overshoot of the current and/or speed) in the motor.

$$\theta_r[t = kT_s] = \theta_r(T_x) + \omega_r T_y = \arg[\bar{i}_s(T_x)] + \frac{\omega_r T_x}{2} + \frac{\pi}{2} + \omega_r T_y. \quad (10)$$

With reference to the start/restart algorithm represented by FIG. 2B, three high-side switches (e.g., switches Q1, Q3, and Q5) or three low-side switches (e.g., switches Q2, Q4, and Q6) are turned ON during cycle 0 or the PWM period, which causes the inverter output voltage to increase or decrease to substantially zero volts. The phase currents (e.g., currents $i_{sa}$, $i_{sb}$, and $i_{sc}$) are sampled after $T_{x1}$, which is at the beginning of cycle 1. An estimate of the rotor or flux position $\theta_{r1}$ is calculated using equation (6), and an estimate of the motor speed $\omega_{r1}$ is calculated using equation (7) or (8) in cycle 1. The estimated new rotor or flux position $\theta_{r1}$ and the estimated new motor speed $\omega_{r1}$ are then used in the sensorless control algorithm in cycle 2 so that the logic (e.g., logic 1510) can continue performing the sensorless control algorithm without making an unwanted transient response (e.g., an overshoot of the current and/or speed) in the motor.

Referring to the start/restart algorithm represented by FIG. 2C, this start/restart algorithm includes the steps represented by cycles 0 and 1 in the timing diagram of the start/restart algorithm represented by FIG. 2B, and also includes a step for determining the direction (positive direction of negative direction) of the motor speed $f_r$. In cycle 2, the phase currents are sampled after $T_{x2}$, which occurs at the beginning of cycle 2. An estimate of the rotor or flux position $\theta_{r2}$ is calculated using equation (6), and an estimate of the motor speed or 2 is calculated using equation (7) or (8) in cycle 2 using the phase currents sampled after $T_{x2}$. The rotor or flux positions $\theta_{r1}$ and $\theta_{r2}$ are compared to one another to determine the direction using equation (9). The new rotor or flux position $\theta_{r2}$, the new motor speed $f_{r2}$, and the direction may then be used in the sensorless control algorithm during cycle 3 so that the logic can continue performing the sensorless control algorithm without making an unwanted transient response (e.g., an overshoot of the current and/or speed) in the motor.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A permanent magnet AC (PMAC) motor system, comprising:
   a PMAC motor including a rotor;
   a three-phase inverter coupled to the PMAC motor and configured to provide a voltage to the PMAC motor; and
   a controller coupled to the three-phase inverter and to the PMAC motor, wherein the controller comprises:
   control logic configured to perform a sensorless control algorithm for controlling the PMAC motor;
   start/restart logic configured to determine when to start/restart the sensorless control algorithm;
   drive logic configured to drive the voltage to substantially zero volts in response to a determined start/restart of the sensorless control algorithm;
   current detect logic configured to detect current in each phase of the three-phase inverter when the voltage is substantially zero volts; and
   estimation logic configured to estimate a first position of the rotor, a speed of the PMAC motor, or both based on the detected current.

2. The PMAC system of claim 1, further comprising input logic configured to input the estimated first position, the estimated speed, or both into the sensorless control algorithm in response to the determined start/restart of the sensorless control algorithm.

3. The PMAC system of claim 1, wherein the three-phase inverter comprises a plurality of high-side switches coupled to the drive logic and a plurality of low-side switches coupled to the drive logic, and wherein the drive logic comprises:
   a first switch logic configured to switch ON each of the plurality of high-side switches and switch OFF each of the plurality of low-side switches to drive the voltage to the substantially zero volts; and
   a second switch logic configured to switch ON each of the plurality of low-side switches and switch OFF each of the plurality of high-side switches to drive the voltage to the substantially zero volts.

4. The PMAC system of claim 1, wherein the detect current logic comprises a first detect logic configured to detect a first amount of current in each phase at a beginning of a first clock cycle, and wherein the estimation logic comprises a first position logic configured to detect the first position based on the detected first amount of current.

5. The PMAC system of claim 4, wherein the detect current logic further comprises a second detect logic configured to detect a second amount of current in each phase at a beginning of a second clock cycle, and wherein the estimation logic further comprises:
   a second position logic configured to detect a second position based on the detected second amount of current; and
   direction estimation logic configured to estimate a direction of the speed based on the first position and the second position.

6. The PMAC system of claim 5, wherein the direction estimation logic comprises:
   compare logic configured to compare the first position and the second position;
   negative speed logic configured to determine that the speed is in a negative direction if the first position includes a value greater than the second position; and positive speed logic configured to determine that the speed is in a positive direction if the second position includes a value greater than the first position.

7. A method for starting or restarting a sensorless control algorithm for controlling a permanent magnet AC (PMAC) motor including a rotor coupled to a three-phase inverter having a voltage and a plurality of high-side switches and a plurality of low-side switches, the method comprising the steps of:
   determining to start/restart the sensorless control algorithm;
   modifying the voltage in response to the determined start/restart of the sensorless control algorithm, wherein modifying the voltage comprises switching ON each of the plurality of high-side switches or each of the plurality of low-side switches;
   detecting current in each phase of the three-phase inverter after the voltage is modified to substantially zero volts; and
   estimating a first position of the rotor, a speed of the PMAC motor, or both based on the detected current.

8. A method for starting or restarting a sensorless control algorithm for controlling a permanent magnet AC (PMAC) motor including a rotor coupled to a three-phase inverter having a voltage, the method comprising the steps of:
   determining to start/restart the sensorless control algorithm;
   modifying the voltage in response to the determined start/restart of the sensorless control algorithm by decreasing or increasing the voltage to substantially zero volts;
   detecting current in each phase of the three-phase inverter after the voltage is modified; and
   estimating a first position of the rotor, a speed of the PMAC motor, or both based on the detected current.

9. The method of claim 8, further comprising the steps of:
   inputting the estimated first position, the estimated speed, or both into the sensorless control algorithm; and
   starting or restarting the sensorless control algorithm using the estimated first position, the estimated speed, or both as initial conditions.

10. A method for starting or restarting a sensorless control algorithm for controlling a permanent magnet AC (PMAC) motor including a rotor coupled to a three-phase inverter having a voltage, the method comprising the steps of:
   determining to start/restart the sensorless control algorithm;
   modifying the voltage in response to the determined start/restart of the sensorless control algorithm;
   detecting current in each phase of the three-phase inverter after the voltage is modified, wherein the detecting current comprises detecting a first amount of current in each phase at a beginning of a first clock cycle; and
   estimating a first position of the rotor, a speed of the PMAC motor, or both based on the detected current, wherein the estimating a first position comprises estimating the first position based on the detected first amount of current.

11. The method of claim 10, wherein the detecting current step further comprises the step of:
   detecting a second amount of current in each phase at a beginning of a second clock cycle, and wherein the estimating step further comprises the steps of:
   estimating a second position based on the detected second amount of current; and
   determining a direction of the speed based on the first position and the second position.

12. The method of claim 11, wherein the determining the direction step comprises the steps of:
   comparing the first position and the second position;
   determining that the speed is in a negative direction if the first position includes a value greater than the second position; and
   determining that the speed is in a positive direction if the second position includes a value greater than the first position.

13. A controller being coupled to a permanent magnet AC (PMAC) motor having a rotor and to a three-phase inverter having a voltage coupled to the PMAC motor, the controller comprising:
   means for performing a sensorless control algorithm utilized to control the PMAC motor, the performing means configured to be coupled to the rotor and the PMAC motor;
   means for determining to when start/restart the sensorless control algorithm in communication with the performing means;
   means for driving the voltage to substantially zero volts in response to a determined start/restart of the sensorless control algorithm in communication with the determining means;
   means for detecting current in each phase of the three-phase inverter when the voltage is substantially zero volts in communication with the driving means; and
   means for estimating a first position of the rotor, a speed of the PMAC motor, or both based on the detected current configured to be coupled to the rotor and the PMAC motor.

14. The controller of claim 13, further comprising:
   input means for inputting the estimated first position, the estimated speed, or both into the sensorless control algorithm; and
   start/restart means for starting or restarting the sensorless control algorithm using the estimated first position, the estimated speed, or both as initial conditions.

15. The controller of claim 13, wherein the three-phase inverter comprises a plurality of high-side switches capable of being coupled to the driving means and a plurality of low-side switches capable of being coupled to the driving means, and wherein the driving means comprises:
   means for switching ON each of the plurality of high-side switches and switching OFF each of the plurality of low-side switches to drive the voltage to the substantially zero volts; and
   means for switching ON each of the plurality of low-side switches and switching OFF each of the plurality of high-side switches to drive the voltage to the substantially zero volts.

16. The controller of claim 13, wherein the detecting current means comprises means for detecting a first amount of current in each phase at a beginning of a first clock cycle, and wherein the estimating means comprises means for estimating the first position based on the detected first amount of current.

17. The controller of claim 16, wherein the detecting current means further comprises means for detecting a second amount of current in each phase at a beginning of a second clock cycle, and wherein the estimating means further comprises:
   means for estimating a second position based on the detected second amount of current; and
   means for estimating a direction of the speed based on the first position and the second position.

18. The controller of claim 17, wherein the direction estimating means comprises:

means for comparing the first position and the second position;
means for determining that the speed is in a negative direction if the first position includes a value greater than the second position; and
means for determining that the speed is in a positive direction if the second position includes a value greater than the first position.

* * * * *